(12) United States Patent
Kaupert

(10) Patent No.: US 8,557,450 B2
(45) Date of Patent: Oct. 15, 2013

(54) FUEL CELL SYSTEM AND CORRESPONDING OPERATING METHOD

(75) Inventor: Andreas Kaupert, Esslingen (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 815 days.

(21) Appl. No.: 12/415,273

(22) Filed: Mar. 31, 2009

(65) Prior Publication Data

US 2009/0258262 A1  Oct. 15, 2009

(30) Foreign Application Priority Data

Apr. 9, 2008 (DE) .................... 10 2008 018 152

(51) Int. Cl.
*H01M 8/00* (2006.01)
(52) U.S. Cl.
USPC ........... 429/408; 429/400; 429/415; 429/423; 429/429
(58) Field of Classification Search
USPC ................. 429/429, 400, 408, 415, 423
See application file for complete search history.

(56) References Cited

U.S. PATENT DOCUMENTS

2008/0160367 A1  7/2008  Masui et al.

FOREIGN PATENT DOCUMENTS

| DE | 102 44 883 | 4/2004 |
| DE | 102005058530 | 7/2007 |
| DE | 112006000796 | 1/2008 |
| DE | 102007039594 | 4/2008 |
| DE | 102006023857 | 9/2008 |

*Primary Examiner* — Jane Rhee
(74) *Attorney, Agent, or Firm* — McGlew and Tuttle, P.C.

(57) ABSTRACT

A fuel cell system (1), especially in a motor vehicle, includes at least one fuel cell (2) for generating electricity, at least one reformer (3) for generating a reformat gas, a fuel supply means (13) for feeding fuel to the reformer (3), a recycling means (83), which has a recycling line (31) connected to the reformer (3) for feeding anode waste gas of the fuel cell (2) to the reformer (3), and an air supply means (17), which has an air line (18) connected to the reformer (3) separately from the recycling line (31) for feeding air to the reformer (3). To increase performance, the fuel supply means (13) may be designed such that fuel can be introduced with it into the recycling line (31).

19 Claims, 4 Drawing Sheets

FUEL CELL SYSTEM AND CORRESPONDING OPERATING METHOD

CROSS REFERENCE TO RELATED APPLICATIONS

This application claims the benefit of priority under 35 U.S.C. §119 of German Patent Application DE 10 2008 018 152.8 filed Apr. 9, 2008, the entire contents of which are incorporated herein by reference.

FIELD OF THE INVENTION

The present invention pertains to a fuel cell system equipped with a reformer as well as to a corresponding operating method.

BACKGROUND OF THE INVENTION

DE 102 44 883 B4 discloses a heating means for a vehicle, which contains a reformer for generating a reformat gas containing hydrogen gas from a fuel containing hydrogen and from an oxidant. Furthermore, an oxidant line connected to an inlet side of the reformer for feeding the oxidant to the reformer is provided. Moreover, a reformat gas line connected to an outlet side of the reformer is provided for drawing off reformat gas. In addition, the heating means comprises an afterburner integrated in the reformat gas line for converting at least part of the reformat gas with an oxidant. Furthermore, an afterburner heat exchanger is provided, which is integrated, on the one hand, in the reformat gas line downstream of the afterburner and which is integrated, on the other hand, in the prior-art heating means into a heating circuit for heating the interior space of a vehicle or for heating an internal combustion engine of the vehicle.

DE 10 2005 058 530 A1 discloses a fuel cell system, whose reformer has two fuel ports, which are separated from one another and lead to a flow evaporator each in the reformer and to which liquid fuel can be fed. The reformer has, furthermore, an air port, to which an air line is connected for supplying the reformer with air. Furthermore, a circulating line may be provided, which introduces anode waste gas of the fuel cell into the air line leading to the reformer upstream of the reformer. In addition, liquid fuel can be introduced into the recycling line in the prior-art fuel cell system, as a result of which the fuel enters at first the air line and via this the reformer. A relatively broad range of performance can be obtained for the reformer due to the different possibilities shown for feeding fuel to the reformer.

SUMMARY OF THE INVENTION

The present invention pertains to the object of proposing an improved embodiment for a fuel cell system or for a corresponding operating method, which embodiment is characterized especially in that especially high performance can be obtained by means of the reformer.

According to the invention, a fuel cell system is provided comprising a fuel cell for generating electricity and a reformer for generating a reformat gas. A fuel supply means is provided for feeding fuel to the reformer. A recycling means is provided having a recycling line connected to the reformer for feeding anode waste gas of the fuel cell to the reformer. An air supply means is provided with an air line connected to the reformer separately from the recycling line for feeding air to the reformer. The fuel supply means introduces fuel into the recycling line.

According to another aspect of the invention, a method is provided for operating a fuel cell system. The method comprises providing a fuel cell system with a fuel cell for generating electricity, a reformer for generating a reformat gas a fuel supply means for feeding fuel to the reformer, a recycling means, which has a recycling line connected to the reformer for feeding anode waste gas of the fuel cell to the reformer and an air supply means with an air line connected to the reformer separately from the recycling line for feeding air to the reformer. The fuel supply means introduces fuel into the recycling line. The method further includes feeding fuel exclusively directly to the reformer for reformer operation up to a predetermined performance limit and feeding fuel to the reformer additionally or exclusively via recycled anode waste gas for reformer operation at a performance exceeding the predetermined performance limit.

The present invention is based on the general idea of equipping the reformer with separate ports for recycled anode waste gas and reformer air fed in. The fuel that is optionally fed into the recycled anode waste gas then mixes with the reformer air in the reformer only. Since the recycled anode waste gas is at a higher temperature level than the air fed into the reformer, the evaporation of the liquid fuel can be improved in the recycling line up to the reformer due to the construction proposed, as a result of which it is possible, on the whole, to evaporate more fuel than can be used to increase the performance of the reformer. In addition, there always is a risk of self-ignition in case of a high fuel-air mixture, which may be desirable within the reformer, but is to be avoided outside the reformer.

If the recycling line contains, according to an advantageous embodiment, a recycling heat exchanger, by means of which the recycled anode gas can be cooled or the air fed into the reformer can be heated, provisions are made in an especially advantageous embodiment for the fuel to be introduced into the recycling line upstream or downstream of the recycling heat exchanger. The upstream arrangement facilitates the evaporation because of the higher temperature level, whereas the downstream arrangement reduces the risk of condensation of the fuel vapor in the recycling heat exchanger.

An afterburner can be integrated in a reformat gas line removing reformat gas from the reformer in another advantageous embodiment. Rapid heating can be achieved as a result especially in case of a cold start of the system. It is especially advantageous in this connection if an afterburner heat exchanger is integrated in the reformat gas line and/or is coupled with the afterburner for heat transfer. The heat generated during the operation of the afterburner can be used as a result to heat educts of the fuel cell system. For example, said afterburner heat exchanger may be integrated upstream of the reformer in an oxidant line, which supplies the reformer and/or fuel cell with oxidant gas, i.e., especially with air.

For example, the reformer can reach stable states for the mixture formation, especially for the evaporation of the fuel, as well as for the partial oxidation of the mixture more rapidly due to the heating or preheating of the oxidant fed into the reformer. Furthermore, the reformer can reach its operating temperature more rapidly as a result. In particular, the heated oxidant facilitates the evaporation of a liquid fuel and reduces hereby the amount of electricity otherwise needed for this.

Due to the shorter start-up phase, the reformer can reach its full load more rapidly and generate a sufficient quantity of reformat gas. The afterburning in the afterburner improves the quality of the reformat gas, which reduces soot formation in the downstream path.

The afterburner can be preferably operated substoichiometrically, as a result of which hydrocarbons that may possibly still be present in the reformat gas can be converted into hydrogen gas, carbon dioxide and carbon monoxide as well as water by partial oxidation. The quality of the reformat gas can be improved hereby, which contributes to a significant improvement in terms of the avoidance of soot formation, e.g., in a downstream fuel cell.

It is apparent that the above-mentioned features, which will still be explained below, can be used not only in the particular combination described, but in other combinations or alone as well, without going beyond the scope of the present invention.

Preferred exemplary embodiments of the present invention are shown in the drawings and will be explained in more detail below, using identical reference numbers for identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
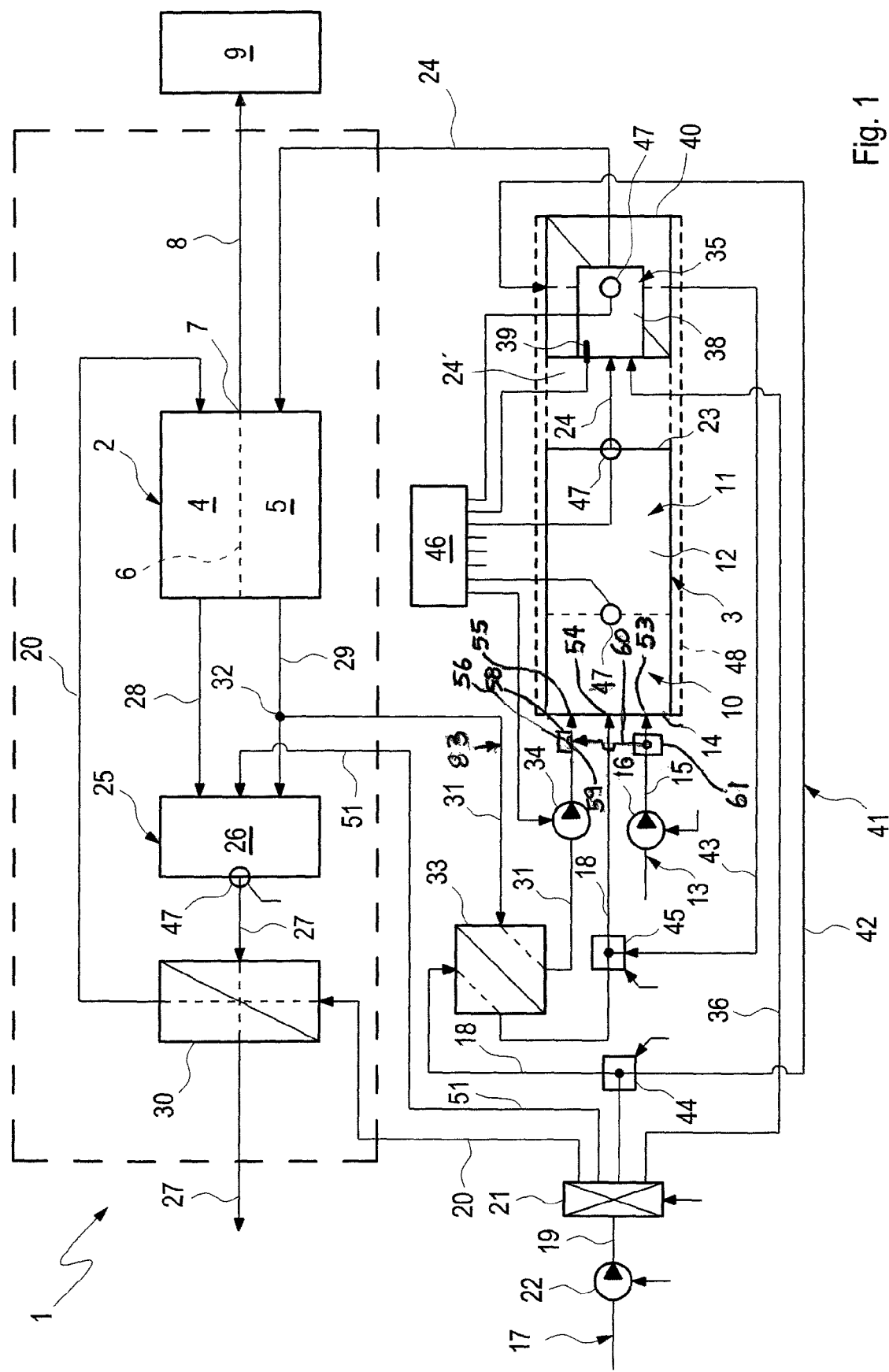
FIG. 1 is a schematic circuit diagram-like basic view of a first embodiment of a fuel cell system according to the invention.
Figure 2:
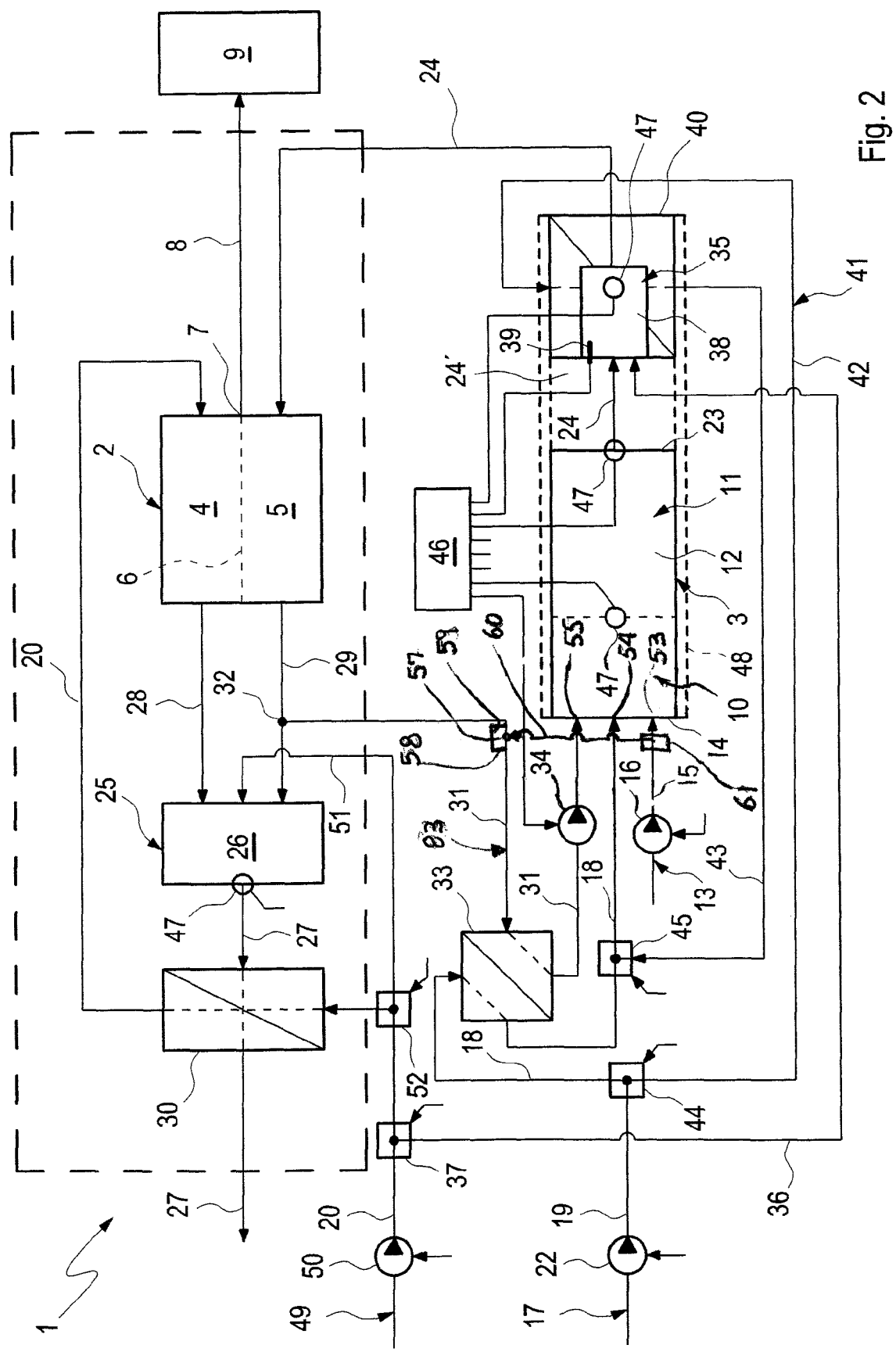
FIG. 2 a schematic circuit diagram-like basic view of a second embodiment of a fuel cell system according to the invention.

Referring to the drawings in particular, corresponding to FIGS. 1 and 2, a fuel cell system 1 comprises at least one fuel cell 2 as well as at least one reformer 3. The fuel cell 2 usually comprises a cathode side 4 as well as an anode side 5, which are separated from one another via an electrolyte 6. The fuel cell 2 reacts during the operation an anode gas containing hydrogen gas with cathode gas containing oxygen gas, e.g., air, at the electrolyte 6, and electric current can be tapped at at least one electric terminal 7. An electrical line 8 leads during the operation to an electrical consumer 9. The fuel cell system 1 may be arranged, for example, in a motor vehicle and act as an additional or a single power source there in order to supply electrical consumers 9 of the vehicle with electricity.

Reformer 3 is designed such that it generates a reformat gas, which contains hydrogen gas and can be fed preferably to the fuel cell 2 as an anode gas, from a fuel containing hydrogen, which may be, in principle, any desired hydrocarbon, preferably a liquid hydrocarbon, and a suitable oxidant, e.g., air. The reformer 3 contains for this a mixture formation section 10 and a reforming section 11. The mixture formation from fuel and oxidant takes place in the mixture formation section 10. If the fuel is a liquid fuel, for example, gasoline, diesel fuel or biofuel, evaporation of the fuel also takes place in the mixture formation section. The mixture formation section 10 may operate, for example, with a cold flame in this case. The partial oxidation of the mixture takes place in the reforming section 11, as a result of which the hydrocarbons are split, e.g., with oxygen into hydrogen gas, carbon monoxide, carbon dioxide and water. The reforming section 11 contains for this a catalyst 12 that is suitable for this.

A fuel supply line 13, which comprises a fuel line 15 connected to an inlet side 14 of the reformer 3 and a delivery means 16, e.g., a pump, which is arranged therein, is provided for supplying the reformer 3 with fuel. The inlet side 14 has a fuel port 53 for this. To supply the reformer 3 with oxidant, which may be especially air, an oxidant or air supply means 17 is provided, which is connected to the inlet side 14 via an oxidant or air line 18. This [inlet side] has an air port 54 for this. The same oxidant or air supply means 17 is also used in the example according to FIG. 1 to supply the fuel cell 2 with cathode gas, which is preferably air. A cathode gas line 20 and the air line 18 branch off for this, e.g., via a suitable valve means 21, from a common supply line 19. A delivery means 22, e.g., a fan, may be arranged in this supply line 19.

As an alternative, a separate second oxidant or air supply means 49, whose oxidant or air line forms directly the cathode gas line 20, may be provided to supply the fuel cell 2 with oxidant gas in the embodiment shown in FIG. 2. This second oxidant feed 49 contains a suitable delivery means 50, e.g., a fan, in the cathode gas line, as a result of which the supply of the fuel cell 2 with oxidant gas is independent from the air supply of the reformer 3. In the embodiment according to FIG. 2, the supply line 19 passes directly over into the air line 18 or is identical thereto.

According to FIGS. 1 and 2, a reformer gas line 24, via which the reformat gas can be removed from the reformer 3, is connected to an outlet side 23 of reformer 3. The reformat gas line 24 is connected to the anode side 5 of the fuel cell 2 in the examples and can also be called hereinafter an anode gas line 24.

In addition, the fuel cell system 1 has a residual gas burner 25 here, which reacts cathode waste gas and anode waste gas in a combustion chamber 26. Burner waste gas, which is removed from the residual gas burner 25 via a waste gas line 27, is formed in this combustion reaction, which may take place with open flame or catalytically. The residual gas burner 25 is connected to the cathode side 4 of the fuel cell 2 via a cathode waste gas line 28. Furthermore, the residual gas burner 25 is connected to the anode side 5 of the fuel cell 2. A heat exchanger 30, which is also integrated into the cathode gas line 20, is integrated into the waste gas line 27 in the example. The heat of the burner waste gas can thus be utilized to heat the cathode gas 20, which increases the efficiency of the fuel cell 2. At least one additional heat exchanger may be arranged in the waste gas line 27, for example, in order to heat the interior space of a vehicle and/or an internal combustion engine. Furthermore, waste gas treating means, e.g., an oxidation catalyst, may be arranged in the waste gas line 27.

In addition, a cooling gas line 51, via which a cooling gas, e.g., air, can be fed to the residual gas burner 25 depending on the needs, is connected to the residual gas burner 25 on the inlet side. In particular, the cooling gas may be mixed with the cathode waste gas. In the embodiment according to FIG. 1, the cooling gas line 51 branches off from the supply line 19 via the valve means 21. The cooling gas line 51 branches off from the cathode gas line 20 via a corresponding control valve 52 in the embodiment shown in FIG. 2.

In addition, a recycling means 83, by means of which anode waste gas can be recycled to the reformer 3 via a recycling line 31, is provided in the embodiments shown here in FIGS. 1 and 2. The recycling line 31 is connected for this to the anode waste gas line 29 at 32 on the inlet side and to the inlet side 14 of the reformer 3 on the outlet side. This [inlet side 14] has a recycling port 55 for this. A recycling heat exchanger 33, which is also integrated into the air line 18, is arranged in the recycling line 31 in this example. The reformer air used to supply the reformer 3 can be heated as a result. At the same time, cooling of the recycled anode waste gas can be achieved hereby. It is clear that the recycling heat exchanger 33 may additionally or alternatively also be integrated into the cathode gas line 20 and/or into the fuel line 15.

A delivery means 34, which may be, for example, a pump, a fan or a compressor or the like, is arranged in the recycling line 31, preferably downstream of the recycling heat exchanger 33.

The reformer 3 presented here is additionally equipped with an afterburner 35, which is integrated into the reformat gas line 24. For example, hydrocarbons still present in the reformat gas can be reacted in the afterburner 35. Reaction of the reformat gas may also take place at least partially in the afterburner 35. In any case, an oxidant, especially oxygen, is needed for this. This oxidant, which is preferably air, is fed to the afterburner 35 via an additional oxidant line 36. This afterburner oxidant line 36 branches off from the supply line 19 via the valve means 21 in the example according to FIG. 1. It is also possible, in principle, to branch off this afterburner oxidant line 36 from the cathode gas line 20 or from the reformer oxidant line 18. The afterburner oxidant line 36 branches off from the cathode gas line 20 via an additional control valve 37 in the example shown in FIG. 2. The afterburner oxidant line 36 is connected to a combustion chamber 38 of the afterburner 35 in both examples. A corresponding ignition aid 39, which may be a glow plug, a sheathed element glow plug or a spark plug or any other igniting member, may be provided for igniting the afterburner combustion reaction. In addition, an ignition aid 82 shown in FIG. 2 may be associated with the reformer 3 or the mixture formation section 10 thereof.

Furthermore, the reformer 3 shown here is equipped with an afterburner heat exchanger 49. On the one hand, this is coupled with the afterburner 35 in a heat-exchanging manner and is additionally or alternatively integrated into the reformat gas line 24, namely downstream of the afterburner 35, and, on the other hand, it is integrated into the reformer oxidant line 18, namely upstream of the reformer 3. The reformer oxidant line 18 has a heat exchanger branch 41 with a feed branch 42 leading to the heat exchanger 40 and with a return 43 returning from the heat exchanger 40 for this purpose. Feed branch 42 branches off from the main line of the reformer oxidant line 18 via a feed branch valve means 44. Return 43 is connected to the main line of the reformer oxidant line 18 via a return valve means 45, namely downstream of the feed branch valve means 44.

The feed branch 42 branches off from the reformer oxidant or air line 18 downstream of the valve means 21 in the embodiment shown in FIG. 1. Contrary to this, the feed branch valve means 44 is integrated into the supply line 19 or is arranged at the transition between the supply line 19 and the air line 18 in the embodiment shown in FIG. 2.

One of the valve means 44 and 45 may also be eliminated, in principle; one of the valve means or the particular valve means may also be arranged within the feed branch 42 or within the return 43. The desired flow path is obtained due to the flow resistance even when only one valve means 44 or 45 is used.

It is remarkable, besides, that the feed branch 42 branches off from the air line 18 or from the supply line 19 upstream of the recycling heat exchanger 33 in the embodiments being shown here.

Furthermore, a control 46 is provided here, which is connected in a suitable manner to the controllable components of the fuel cell system 1, i.e., for example, to the delivery means 16, 22, 34, 50, and to the valve means 37, 44, 45, 52, as well as to the ignition aid 39. In addition, control 46 may be coupled with various sensors 47, which may be, for example, temperature sensors and/or pressure sensors or the like.

The afterburner 35 and the afterburner heat exchanger 40 form one structural unit in the preferred example shown. The afterburner heat exchanger 40 encloses here the afterburner 35 or combustion chamber 38 thereof at least partially in the circumferential direction. Furthermore, a common tubular body 48 is symbolically indicated by a broken line in the embodiment being shown here. This common tubular body 48 is used as a common housing for the afterburner heat exchanger 40 and the afterburner 35. Furthermore, this tubular body 38 forms a section of the reformat gas line 24, namely, at least the section extending between reformer 3 and afterburner 35. Said section is designated by 24' here. In addition, reformer 3 is accommodated in said tubular body 48 in the example. An especially compact design is obtained as a result for the reformer 3 equipped with the afterburner 35 and with the afterburner heat exchanger 40.

In addition, the fuel supply means 13 is designed in the fuel cell system 1 being shown here such that liquid fuel can be introduced with it into the recycling line 31. The fuel supply means 13 can introduce the fuel into the recycling line 31 corresponding to FIG. 1 downstream of the recycling heat exchanger 33 and especially downstream of the delivery means 34 at 56. Condensation of the fuel vapor in the recycling heat exchanger 33 can be avoided as a result. As an alternative, the fuel supply means 13 may introduce the fuel into the recycling line 31 upstream of the recycling heat exchanger 33 at 57 according to FIG. 2. A higher temperature level prevails in the returned anode waste gas at the introduction site 57 selected in FIG. 2, which is advantageous for the evaporation of the liquid fuel fed.

It is of particular significance here that reformer 3 has separate ports 54 and 55, respectively, for the air line 18 and for the recycling line 31, so that the media are separated up to the reformer 3. Self-ignition of the anode waste gas-fuel mixture can be avoided as a result even in case of hot recycled anode waste gases, because the oxidant necessary for this is absent. To support the evaporation of the liquid fuel introduced into the recycling line 31, the particular introduction site 56, 57 may be embodied by means of an introduction means 58, which is connected to the fuel supply means 13, on the one hand, and to the recycling line 31, on the other hand. The introduction means 58 may have, for example, a surface 59, against which recycled anode waste gas flows during the operation of the fuel cell system and to which the liquid fuel is fed such that the fuel is distributed thereon. The surface of the fuel is increased hereby, which facilitates the evaporation of the fuel. The admission of the hot recycled anode waste gas to the surface also supports the evaporation at the same time.

To introduce liquid fuel into the recycling line 31, the fuel supply means 13 is equipped with a branch line 60, which branches off from the fuel line 15 via a valve means 61, as a result of which the fuel line 15 forms a main branch of the fuel supply means 13. Said main branch, i.e., the fuel line 15, leads directly to the reformer 3, while branch line 60 leads directly to the recycling line 31. Valve means 61 can be actuated by means of control 46 and can divide the fuel flow of the delivery means 16 quasi as desired between the reformer 3 and the recycling line 31.

Figure 3:
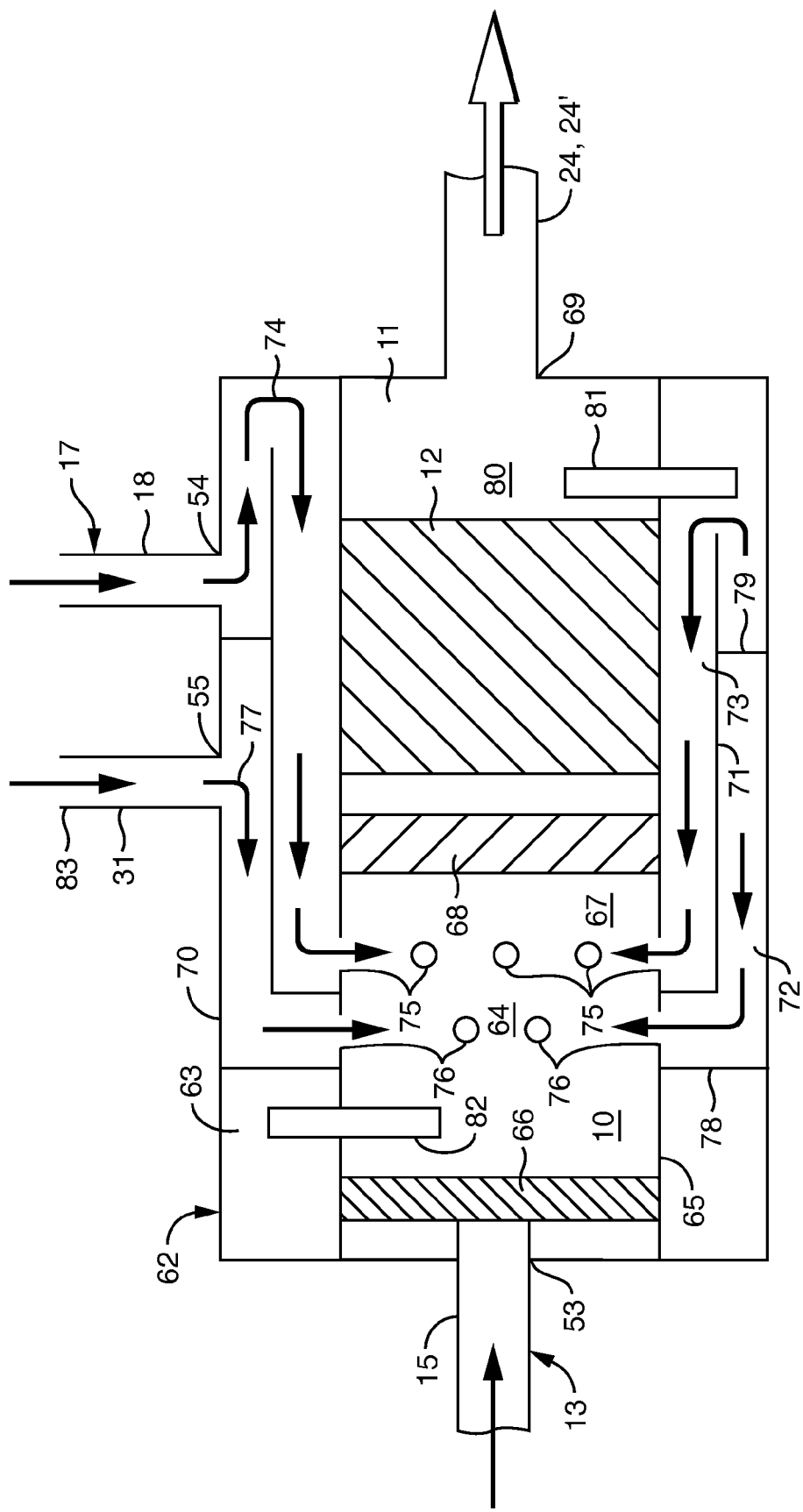
FIG. 3 is a schematic longitudinal sectional and circuit diagram-like view through a reformer embodiment according to the invention.
Figure 4:
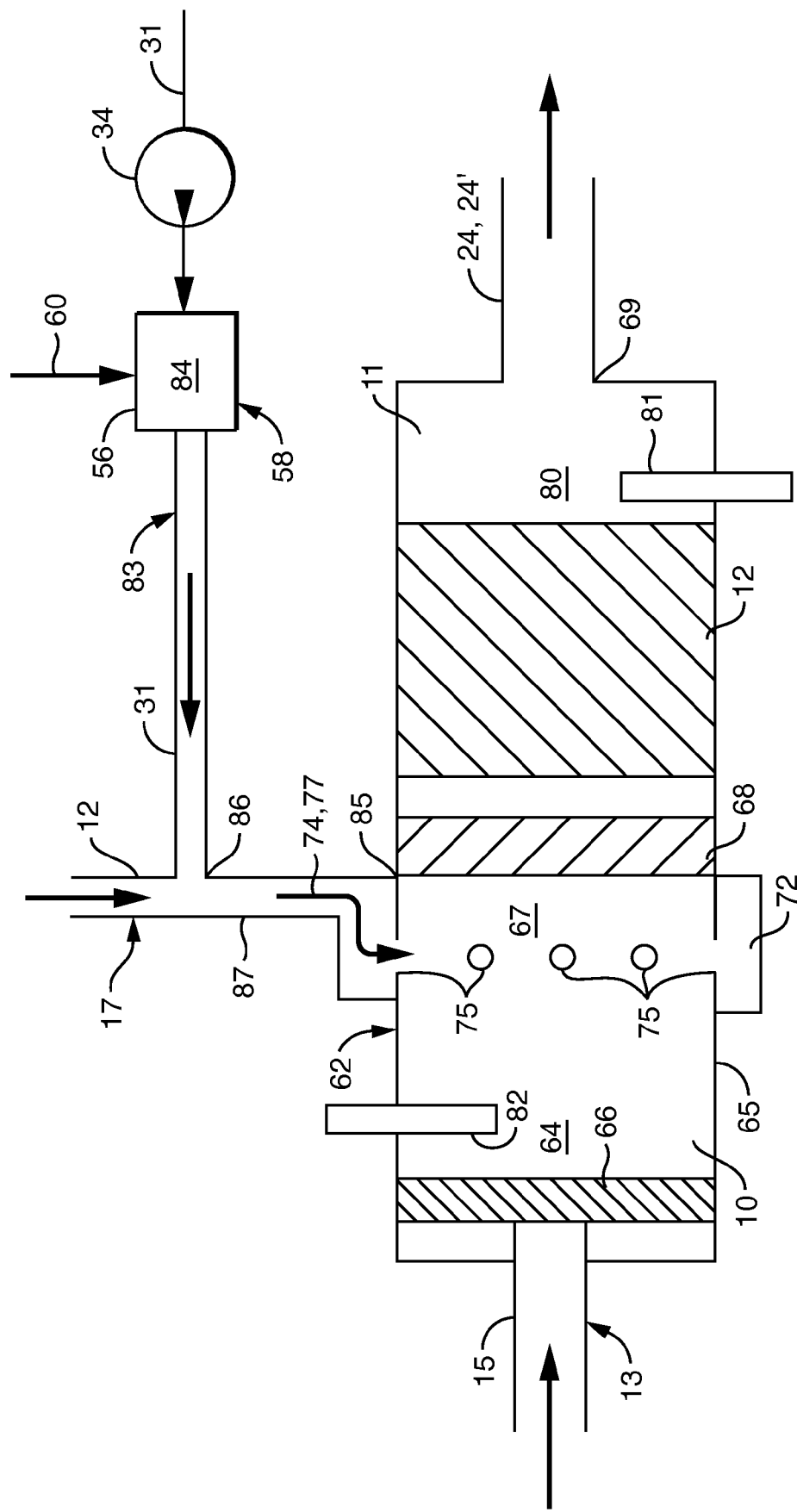
FIG. 4 is a schematic longitudinal sectional and circuit diagram-like view through another reformer embodiment according to the invention.

Corresponding to FIGS. 3 and 4, reformer 3 may have, in an especially compact design, a tubular housing 62, which may also be, in particular, the tubular body 48. Housing 62 has a double-wall design in the embodiment shown in FIG. 3, whereas a single-wall design is shown in reformer 3 according to FIG. 4. At least two cavities 63, 64, which may be especially cylindrical and arranged coaxially in relation to one another, are embodied in the double-wall housing 62, while at least one cavity 64 is present in the single-wall housing 62. The inner cavity 64 located on the inside is connected to the fuel supply means 13, for which purpose the fuel line 15 is connected to the fuel port 53. A wall 65 enclosing the cavity 64 located on the inside forms a jacket or an inner jacket and carries an evaporator means 66, which may be designed, for example, as a nonwoven mat evaporator. Cavity 64 located on the inside forms, in addition, to a mixture formation section 10 or a prereaction chamber 67. This is jointed within the wall 65 by the reforming section 11, in which the catalyst 12 is arranged. A flame trap 68 may be arranged between the two sections 10 and 11. Furthermore, housing 62 has an outlet port 69, to which the reformat gas line or anode gas line 24 and 24', respectively, which leads to the afterburner 35 or to the fuel cell 2, is connected.

While the cavity 64 located on the inside is enclosed by the wall or inner wall 65 located on the inside, a wall or outer wall 70 located on the outside encloses the cavity 63 located on the outside in the embodiment according to FIG. 3. To this outer wall 70 are connected the air line 18 of the air supply means 17 via the air port 54, on the one hand, and the recycling line 31 via the recycling port 55, on the other hand. An intermediate wall 71, which separates two annular chambers 72 and 73 arranged coaxially with one another within the annular cavity 63 located on the outside from one another, is arranged between the inner wall 65 and the outer wall 70. The chamber located on the inside or inner chamber 73 leads via an air path 74 indicated by arrows to a plurality of air inlet openings 75, which are arranged especially in an annularly distributed pattern and are formed at the inner wall 65. Contrary to this, the chamber or outer chamber 72 located on the outside connects the recycling port 55 to recycling openings 76, which are preferably designed as holes distributed in an annular pattern at the inner wall 65. A recycling path 77 indicated by arrows is embodied hereby in reformer 3. Respective intermediate bottoms 78 and 79 arranged in the housing 62 bring about separation of the two gas paths 74, 77, so that air and recycled gas can mix and possibly react with one another only in the prereaction chamber 67.

A plurality of peculiarities, which can be embodied each in itself or in any desired combination, can be recognized in the embodiment shown in FIG. 4. In the reformer 3 according to FIG. 4, chamber 72 surrounds the wall 65 exclusively in front of or upstream of the flame trap 68. Cooling of the flame trap 68 and of the downstream catalyst 12 by the gas feed over the chamber 72 can be avoided as a result. The recycling line 31 and the air line 18 have no separate ports 54, 55 at the reformer 3, but a common port 85 in the embodiment shown in FIG. 4. The air line 18 and the recycling line 31 are merged for this at 86 and connected to said common port 85 via a common line section 87. The two gas paths 74 and 77 coincide as a result. Sufficient mixing of the air and recycled anode waste gas or of the air and a mixture of recycled anode waste gas and more or less evaporated fuel can already become established up to the inlet openings 75. In addition, the embodiment shown in FIG. 4 shows a variant of the introduction means 58, which contains a free space 84, into which the liquid fuel can be injected, e.g., by injection or atomization, and through which the recycled anode waste gas flows.

It is remarkable here that the gases recycled via the gas path 77 reach the prereaction chamber 67 while bypassing the evaporator means 66.

The reforming section 11 forms a main reaction chamber 80 located downstream of the prereaction chamber 67. Reformer 3 preferably has at least one temperature sensor 81 in this main reaction chamber 80. Reformer 3 has an igniting member 82, which may be, for example, a sheathed element glow plug or a spark plug or the like, in the prereaction chamber 67 in the example.

The fuel cell system 1 shown here or the reformer 3 shown here can be operated advantageously as follows:

During a cold start, when the components of the fuel cell system 1 or of the reformer 3 are at ambient temperature, reformer 3 is started and operated at first as a burner until its catalyst 12 reaches the activation temperature. This burner operation of the reformer 3 is achieved by hyperstoichiometry. Operation is subsequently switched over to reformer operation, passing over to substoichiometry for this, for example, to an air ratio of about 0.4. Reformat gas, which had already been generated by the reformer 3, can be subsequently reacted in the afterburner 35 at least partially with oxidant. The oxidant needed for this is fed via the afterburner oxidant line 36. The oxidant branched off in the process partially from the supply line 19 (FIG. 1) or from the cathode gas line 20 (FIG. 2) is needed by the fuel cell 2 only conditionally at this point in time of the warm-up phase. For example, reformat gas not reacted in the residual gas burner 25 is reacted with oxidant, i.e., cathode gas. Air is advantageously used as the oxidant for the reformer 3 as well as for the afterburner 35 and optionally as a cathode gas, as a result of which common oxidant feed 17 can, in principle, be embodied according to FIG. 1.

Heat is generated in the afterburner 35 by the reaction of the reformat gas, and this heat can be used to heat the reformer. This is carried out here by the valve means 44 and 45 being switched such that the oxidant flow does not reach the reformer 3 directly through the main line of the reformer oxidant line 18, but must flow over the feed branch 42, over the afterburner heat exchanger 40 and over the return 43 before it reaches the inlet side 14 of the reformer 3 via the still active part of the oxidant line 18. The oxidant fed into the reformer 3 is heated in the afterburner heat exchanger 40. The heated oxidant simplifies especially the evaporation of the liquid fuel, simplifies the reaction of the fuel-oxidant mixture and increases, on the whole, the temperature level of reformer 3. Only part of the reformat gas is preferably reacted in this heat-up operation, so that the rest of the reformat gas and especially the larger part of this reformat gas can be fed as anode gas to the fuel cell 2. Heating of the fuel cell 2 can also be brought about hereby. Since especially only part of the reformat gas is reacted in the afterburner 35, anode waste gas, which contains a relatively high percentage of reformat gas in case of low reaction or no reaction in the fuel cell 2, can additionally be preferably fed to the reformer 3 via the recycling line 31 during this start-up phase as well. This measure can also be used for the more rapid heating of reformer 3. Since also only a part of the anode waste gas is preferably recycled, combustion of the anode waste gas, which corresponds to the anode gas in case of absence of reaction in the fuel cell 2, can be preferably carried out in the residual gas burner 25.

As soon as reformer 3 has reached its operating temperature, the valve means 44 and 45 are switched such that branch 41 is deactivated, so that the oxidant gas can now again be fed directly to the reformer 3 via the main line of the reformer oxidant line 18.

The afterburner 35 can also be operated for the normal operation in order to improve the quality of the reformat gas. It is especially advantageous for this to operate the afterburner 35 substoichiometrically. The tendency to soot formation can be reduced in the downstream path by the improved quality of the reformat gas.

To avoid overheating of the afterburner 35 or of the afterburner heat exchanger 40 or of the fuel cell 2, a suitable temperature sensor 47 may be arranged in the afterburner 35 or in the reformat gas line 24.

The quantity of reformat gas that can be generated by evaporating liquid fuel in the evaporator means 66 is sufficient for normal performances of the fuel cell system 1. The evaporating performance of evaporator 66 is limited. At such normal performances, control 46 actuates the valve means 61 such that the fuel is fed exclusively via the fuel line 15 in the reformer 3, i.e., exclusively to the evaporator means 66. When more reformat is nevertheless needed, for example, for increased performance of the fuel cell 2 and/or of at least one more reformat gas consumer, control 46 can actuate the valve means 61 such that liquid fuel is increasingly also fed to the recycling line 31, so that additional fuel reaches the reformer 3 via the reformat line 31. On the whole, the quantity of fuel fed to the reformer 3 can thus be increased. The quantity of reformat gas that can be generated by means of the reformer 3 can be increased hereby, which corresponds to an increase in the performance of reformer 3. For example, control 46 operates with limit values or threshold values now. Correspondingly, the fuel can be fed exclusively directly to the reformer 3 for reformer operation with up to a predetermined performance limit, whereas the fuel is fed to the reformer 3 additionally or exclusively via recycled anode waste gas at a performance exceeding the predetermined performance limit. Furthermore, control 46 can take into account a predetermined temperature limit in the reformer, to the extent that feeding of fuel via the recycled anode waste gas is carried out only when the temperature of the reformer 3 is above a predetermined temperature limit.

While specific embodiments of the invention have been shown and described in detail to illustrate the application of the principles of the invention, it will be understood that the invention may be embodied otherwise without departing from such principles.

What is claimed is:

1. A fuel cell system, comprising:
a fuel cell for generating electricity;
a reformer for generating a reformat gas;
a fuel supply means for feeding fuel to the reformer;
a recycling means, which has a recycling line connected to the reformer for feeding uncombusted anode waste gas of the fuel cell to the reformer;
an air supply means with an air line connected to the reformer separately from the recycling line for feeding air to the reformer, wherein the fuel supply means introduces fuel into the recycling line.

2. A fuel cell system in accordance with claim 1, wherein:
said reformer has a fuel port to which a fuel line of said fuel supply means is connected and which leads to an evaporation means for evaporating fuel fed in the liquid state;
said reformer contains a prereaction chamber, into which the fuel vapor produced by the evaporation means enters;
said reformer has a recycling port, to which the recycling line is connected, and which leads to the prereaction chamber via a gas path bypassing the evaporation means.

3. A fuel cell system in accordance with claim 1, wherein a recycling heat exchanger is provided, which is both integrated into the recycling line and is integrated into the air line.

4. A fuel cell system in accordance with claim 3, wherein the fuel supply means is designed such that fuel can be introduced by said fuel supply means into the recycling line upstream of or downstream of the recycling heat exchanger.

5. A fuel cell system in accordance with claim 1, wherein for feeding fuel to the recycling line, the fuel supply means is connected to an introduction means integrated into said recycling line and having a surface, against which a flow of the recycled anode waste gas is directed during operation, and on which liquid fuel fed is distributed, or which contains a free space, through which the recycled anode waste gas flows and into which the liquid fuel is injected during the operation.

6. A fuel cell system in accordance with claim 1, wherein
said reformer contains a main reaction chamber in which a catalyst is arranged;
said reformer has at least one temperature sensor arranged downstream or upstream of said catalyst.

7. A fuel cell system in accordance with claim 1, wherein the fuel supply means has a common fuel line, which fuel flow through a valve means into at least two fuel lines including a fuel line leading directly to the reformer and a fuel line leading to the recycling line.

8. A fuel cell system in accordance with claim 1, further comprising:
a reformat gas line removing reformat gas from the reformer; and
an afterburner integrated into said reformat gas line.

9. A fuel cell system in accordance with claim 8, further comprising:
an afterburner heat exchanger integrated into the reformat gas line downstream of said afterburner and/or coupled with said afterburner.

10. A fuel cell system in accordance with claim 9, wherein said afterburner heat exchanger is integrated into a branch of the air line upstream of the reformer.

11. A fuel cell system in accordance with claim 1, further comprising:
a control cooperating operatively connected to one or more of said fuel cell, said reformer, said fuel supply means, said recycling means and said air supply means for controlling the fuel cell system.

12. A fuel cell system in accordance with claim 11, wherein said control:
controls the feed of fuel so fuel is fed exclusively directly to the reformer for reformer operation up to a predetermined performance limit;
controls the feed of fuel so fuel is fed to the reformer additionally or exclusively via recycled anode waste gas for reformer operation at a performance exceeding the predetermined performance limit.

13. A fuel cell system in accordance with claim 12, wherein said controls the feed of fuel so fuel is fed via recycled anode waste gas only above a predetermined temperature limit.

14. A method for operating a fuel cell system, the method comprising:
providing a fuel cell system with a fuel cell for generating electricity, a reformer for generating a reformat gas a fuel supply means for feeding fuel to the reformer, a recycling means, which has a recycling line connected to the reformer for feeding uncombusted anode waste gas of the fuel cell to the reformer and an air supply means with an air line connected to the reformer separately from the recycling line for feeding air to the reformer, wherein the fuel supply means introduces fuel into the recycling line;

feeding fuel exclusively directly to the reformer for reformer operation up to a predetermined performance limit; and feeding fuel to the reformer additionally or exclusively via recycled anode waste gas for reformer operation at a performance exceeding the predetermined performance limit.

15. A method in accordance with claim 14, wherein fuel is fed via recycled anode waste gas only above a predetermined temperature limit.

16. A method for operating a fuel cell system, the method comprising:

providing a fuel cell system with a fuel cell for generating electricity, a reformer for generating a reformat gas a fuel supply means for feeding fuel to the reformer, a recycling means, which has a recycling line connected to the reformer for feeding chemically unprocessed anode waste gas of the fuel cell to the reformer and an air supply means with an air line connected to the reformer separately from the recycling line for feeding air to the reformer, wherein the fuel supply means introduces fuel into the recycling line;

feeding fuel exclusively directly to the reformer for reformer operation up to a predetermined performance limit; and feeding fuel to the reformer additionally or exclusively via recycled anode waste gas for reformer operation at a performance exceeding the predetermined performance limit.

17. A method for operating a fuel cell system, the method comprising:

providing a fuel cell system with a fuel cell for generating electricity, a reformer for generating a reformat gas a fuel supply means for feeding fuel to the reformer, a recycling means, which has a recycling line connected to the reformer for feeding anode waste gas of the fuel cell to the reformer and an air supply means with an air line connected to the reformer separately from the recycling line for feeding air to the reformer, wherein the fuel supply means introduces fuel into the recycling line;

feeding said anode waste gas in a continuous gaseous form from said fuel cell to said reformer;

feeding fuel exclusively directly to the reformer for reformer operation up to a predetermined performance limit; and feeding fuel to the reformer additionally or exclusively via recycled anode waste gas for reformer operation at a performance exceeding the predetermined performance limit.

18. A fuel cell system, comprising:
a fuel cell for generating electricity;
a reformer for generating a reformat gas;
a fuel supply means for feeding fuel to the reformer;
a recycling means, which has a recycling line connected to the reformer for feeding chemically unprocessed anode waste gas of the fuel cell to the reformer;
an air supply means with an air line connected to the reformer separately from the recycling line for feeding air to the reformer, wherein the fuel supply means introduces fuel into the recycling line.

19. A fuel cell system, comprising:
a fuel cell for generating electricity;
a reformer for generating a reformat gas;
a fuel supply means for feeding fuel to the reformer;
a recycling means, which has a recycling line connected to the reformer for feeding anode waste gas of the fuel cell to the reformer, said anode waste gas being in continuous gaseous form from said fuel cell to said reformer;
an air supply means with an air line connected to the reformer separately from the recycling line for feeding air to the reformer, wherein the fuel supply means introduces fuel into the recycling line.

* * * * *